United States Patent
Iwamoto et al.

(10) Patent No.: US 9,604,327 B2
(45) Date of Patent: Mar. 28, 2017

(54) NUT FEEDING APPARATUS

(71) Applicant: Dengensha Manufacturing Company Limited, Kawasaki-shi, Kanagawa (JP)

(72) Inventors: Yoshiaki Iwamoto, Kanagawa (JP); Go Tamura, Kanagawa (JP); Shuhei Saeki, Kanagawa (JP)

(73) Assignee: Dengensha Manufacturing Company Limited, Kawasaki-shi (JP)

( * ) Notice: Subject to any disclaimer, the term of this patent is extended or adjusted under 35 U.S.C. 154(b) by 0 days.

(21) Appl. No.: 14/938,993

(22) Filed: Nov. 12, 2015

(65) Prior Publication Data

US 2017/0008136 A1 Jan. 12, 2017

(30) Foreign Application Priority Data

Jul. 7, 2015 (JP) .................. 2015-136517

(51) Int. Cl.
 *B65H 3/08* (2006.01)
 *B23P 19/00* (2006.01)
 *B23K 11/00* (2006.01)

(52) U.S. Cl.
 CPC .......... *B23P 19/005* (2013.01); *B23K 11/002* (2013.01)

(58) Field of Classification Search
 CPC ................................ B23K 11/14; B23P 19/00
 USPC ....................................................... 221/278
 See application file for complete search history.

(56) References Cited

U.S. PATENT DOCUMENTS

| | | | | |
|---|---|---|---|---|
| 4,101,054 A | * | 7/1978 | Frost ....................... | B25B 23/04 221/225 |
| 4,200,180 A | * | 4/1980 | Dixon ................... | B23P 19/006 198/468.1 |
| 4,815,206 A | * | 3/1989 | Jangaard ............... | B23P 19/003 29/809 |
| 4,953,749 A | * | 9/1990 | Kubota ................ | H05K 13/027 221/168 |
| 5,511,690 A | * | 4/1996 | Calhoun .............. | B65G 59/062 221/197 |
| 5,895,584 A | | 4/1999 | Sakota | |
| 6,082,577 A | * | 7/2000 | Coates .................. | B65B 13/027 221/278 |

(Continued)

FOREIGN PATENT DOCUMENTS

| | | | |
|---|---|---|---|
| JP | 2010-538 A | | 1/2010 |
| JP | 2010162597 | * | 7/2010 |
| JP | 5251534 B2 | * | 7/2013 |

OTHER PUBLICATIONS

Extended European Search Report issued in counterpart European Application No. 15193341.3 dated Nov. 4, 2016 (six (6) pages).

*Primary Examiner* — Rakesh Kumar

(74) *Attorney, Agent, or Firm* — Crowell & Moring LLP

(57) ABSTRACT

A nut feeding apparatus for feeding a weld nut to an upper electrode of a resistance welding machine, whose size and production cost are reduced, is disclosed. The apparatus comprises a piston rod, a tension rod, a tube, a link mechanism and a nut chuck. When the piston rod is in a most retracting state, an upper surface of the nut chuck becomes substantially flush with a lower portion of an opening of the tube. While the tension rod is at a stop in a most advancing state and when the piston rod further advances, the link mechanism rotates around a rotation axis at a tip of the tension rod, and thereby, the weld nut held by the nut chuck moves to a feeding position of the weld nut in the upper electrode.

5 Claims, 14 Drawing Sheets

(56) References Cited

U.S. PATENT DOCUMENTS

| | | | |
|---|---|---|---|
| 6,254,332 B1 | 7/2001 | Miura et al. | |
| 6,443,669 B2 * | 9/2002 | Saito | H05K 13/021 198/390 |
| 2012/0181735 A1 * | 7/2012 | Ooe | B62D 65/18 269/17 |
| 2013/0269164 A1 * | 10/2013 | DeHart | B65B 69/0033 29/426.5 |

* cited by examiner

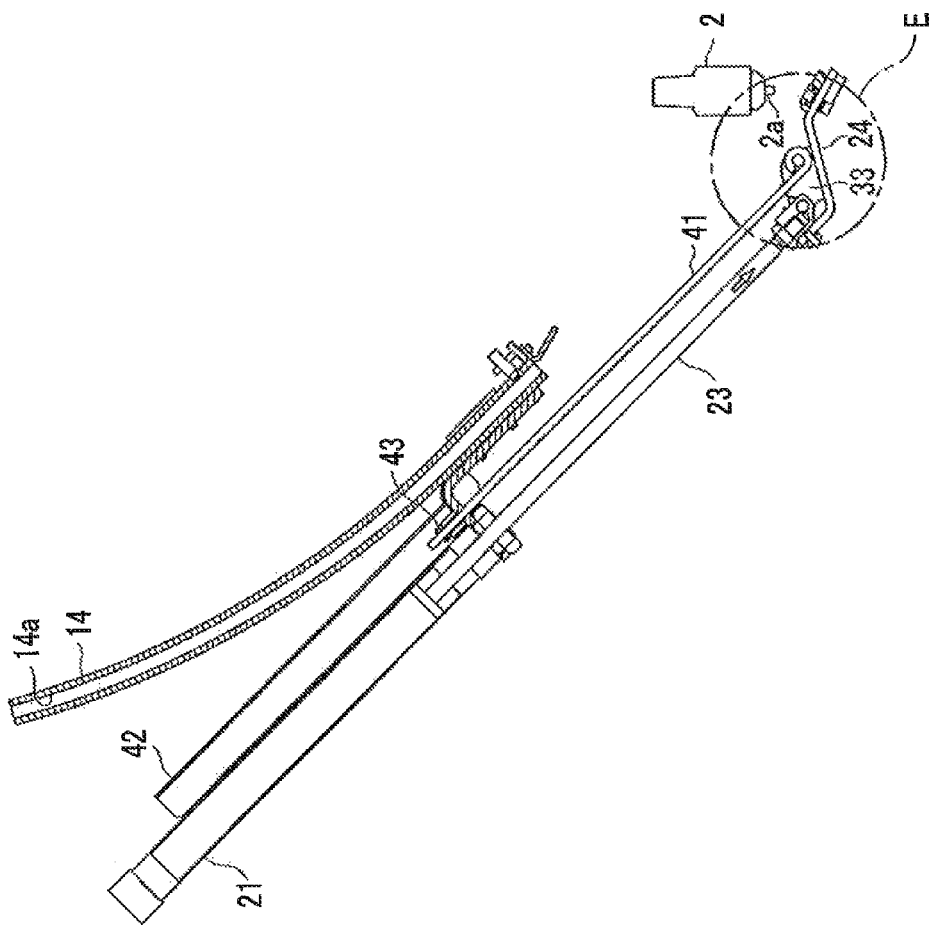
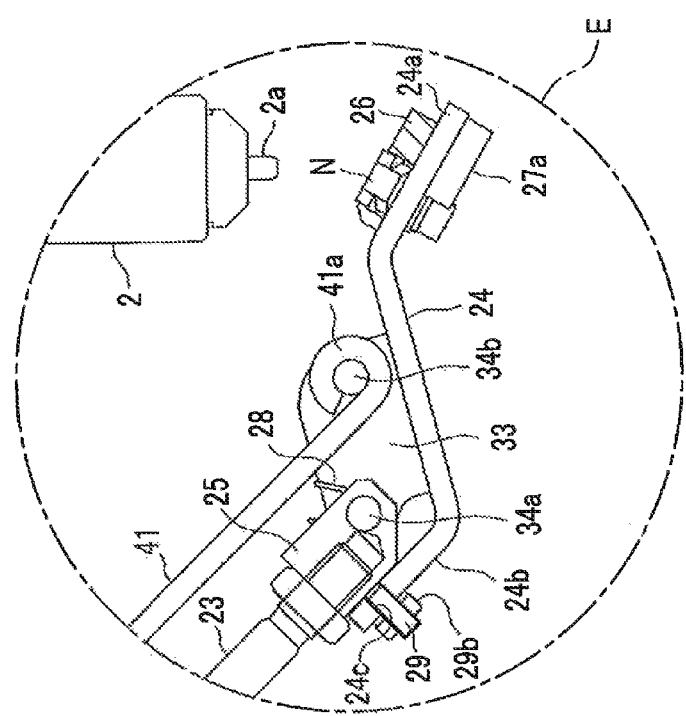

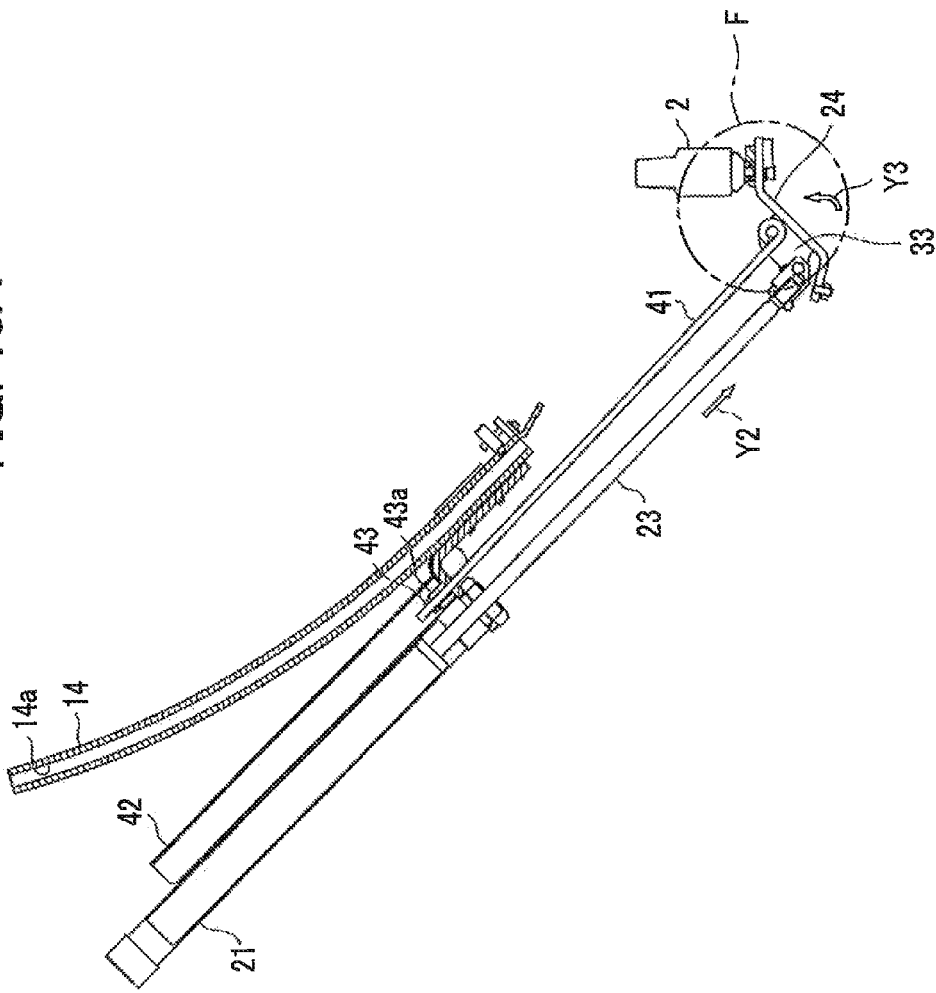
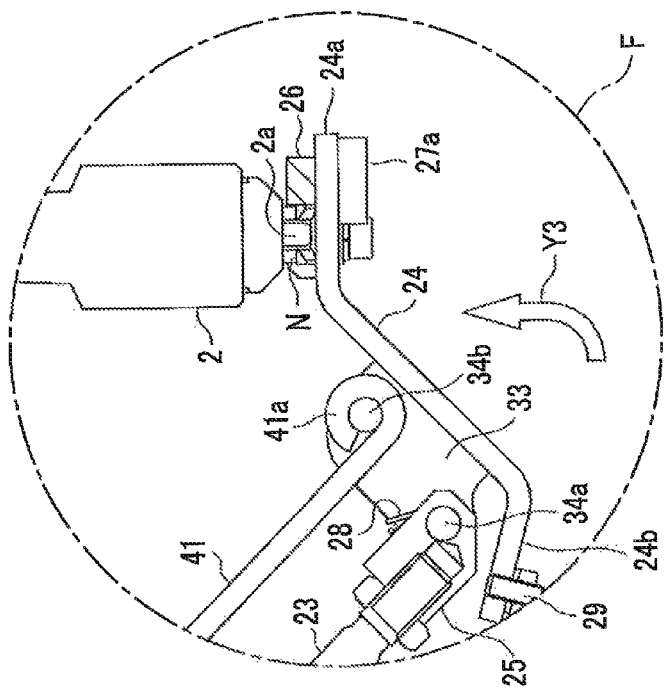

NUT FEEDING APPARATUS

CROSS REFERENCE TO RELATED APPLICATIONS

This application claims the foreign priority benefit of Japanese Patent Application No. 2015-136517 filed on Jul. 7, 2015 in the Japan Patent Office, disclosure of which is herein incorporated by reference in its entirety.

BACKGROUND OF THE INVENTION

1. Technical Field

The present invention relates to a nut feeding apparatus that feeds nuts which are to be welded to a work of an iron plate or the like to a resistance welding machine.

2. Description of Related Art

A nut feeding apparatus for resistance welding as described in JP 5251534 B, for example, is known as a conventional nut feeding apparatus. In this nut feeding apparatus, a nut is fed to an upper electrode of a resistance welding machine having a pair of electrodes facing up and down. The nut having been fed is held by the upper electrode and the nut held by the upper electrode is placed on a work fixed on the lower electrode. Then, the nut and the work sandwiched by the upper electrode and the lower electrode are energized, and thereby both are welded together.

The above nut feeding apparatus has the following configuration. A nut feeding chute extending substantially perpendicularly to the floor is combined with a nut feeder having an elongated shape and being arranged in an inclined manner, by communicating therewith at an intermediate position on an upper surface side thereof. Nuts successively falling through the chute then glide on an inclined path of the nut feeder. A nut which is so gliding is fitted to a pin of a nut receiver at a distal portion of the nut feeder to be caught thereby.

At this time, the nuts sometimes jump to drop out. In order to prevent this, a movable guide is arranged above the nut receiver. The nut receiver having the pin to which a nut is fitted is advanced together with the movable guide to a predetermined position below the upper electrode of the resistance welding machine. When the nut disposed at the predetermined position is moved to a pin of the upper electrode and is held by air pressure, the nut receiver retracts, and thereafter, the movable guide retracts. Then, the upper electrode goes down and the nut is welded to the work between the upper electrode and the lower electrode.

In the nut feeding apparatus as described in the above JP 5251534 B, however, the nut feeding chute which makes nuts substantially perpendicularly and successively fall down extends long in a vertical direction. In addition, the nut feeding apparatus has a complex structure for performing complex behavior which includes making nuts successively and substantially perpendicularly fall through the chute, making them glide on the inclined path, then fitting a nut to the pin of the nut receiver to be caught thereby, moving the received nut to the pin of the upper electrode, and holding it by the air pressure.

Due to such a complex structure as mentioned above, many components including at least two air cylinders are necessary, and therefore, there are problems that the production cost is high, and the size of the nut feeding apparatus is large mainly because the nut feeding chute extends long in a vertical direction.

BRIEF SUMMARY OF THE INVENTION

The present invention has been made considering the above problems, and its object is to provide a nut feeding apparatus which can reduce size and production cost of the whole apparatus.

In order to solve the above problems there is provided a nut feeding apparatus for feeding a nut to an upper electrode of a resistance welding machine, comprising a first rod advanced and retracted by an air cylinder, a second rod arranged above the first rod and advancing/retracting in conjunction with the first rod, a tube pneumatically feeding the nut, a link mechanism rotatably attached to a tip of the first rod and to a tip of the second rod using a first rotation axis and a second rotation axis, respectively, and a nut chuck fixed to the link mechanism on a forward side of the link mechanism and having a nut guide on an upper surface of the nut chuck, the nut guide being for catching and holding the nut fed by the tube, wherein the link mechanism rotates around the second rotation axis while the second rod is at a stop in a most advancing state and when the first rod further advances, to feed the nut held by the nut guide to the upper electrode.

According to the above configuration, the nut feeding apparatus can be implemented by using only one air cylinder and by juxtaposition of slightly inclined two rods and a tube. There is no component extending up and down. Therefore, few parts are used and the whole apparatus can be downsized, and thus, size and production cost of the whole nut feeding apparatus can be reduced.

The tip of the second rod is preferably arranged in the link mechanism in a more advancing position than the tip of the first rod, so that the second rotation axis moves upward while the second rod is at a stop in the most advancing state and when the first rod further advances.

According to this configuration, since a front end of the nut chuck moves upward, the nut is more easily fitted to the upper electrode, than in a case where the nut chuck rotates while the second rotation axis does not move.

The second rod is preferably supported by being inserted into a through hole formed in a plate fixed to the air cylinder and extending upward, wherein the through hole has a shape sufficient for the second rod inserted into the through hole to be able to move up and down over a predetermined length.

According to this configuration, while the second rod which advances in response to advance of the first rod linked through the link mechanism to the second rod stops advance due to abutting of a stopper of the second rod against the plate and when the first rod further advances, the link mechanism rotates around the second rotation axis because the second rod stops advance. At this time, a force lifting up the tip of the second rod works through the link mechanism.

Since a proximal side of the second rod is inserted into the through hole of the plate movably up and down, the proximal side of the second rod moves downward when the aforementioned lifting force is applied to the tip of the second rod. Accordingly, the second rotation axis moves obliquely upward. Thus, both of the link mechanism and the nut chuck slightly move upward while rotating. In other words, an action of both going down once is eliminated. Therefore, the nut held by the nut guide of the nut chuck can be efficiently fed to the upper electrode.

The second rod may be formed by a rod made of a material that flexes and recovers.

According to this configuration, when the force lifting up the second rotation axis is applied as mentioned above, the second rod flexes downward approximately in the central section thereof and the second rotation axis moves obliquely upward. Accordingly, the nut held by the nut guide of the nut chuck can be efficiently fed to the upper electrode.

It is preferable that the apparatus further comprises an upper claw provided on an upper portion of an opening of the tube. The upper claw extends in a direction of discharging nuts. When the first rod is in a most retracted state, an upper surface of the nut chuck becomes substantially flush with a lower portion of the opening of the tube in a manner inclined along an orbit of the nut fed by the tube and the upper claw is arranged above the upper surface of the nut chuck and spaced apart therefrom by a predetermined distance.

According to this configuration, when the first rod is in the most retracted state, the nut guide is arranged between the upper surface of the nut chuck and the upper claw both of which are inclined along a discharge orbit of the nut. Accordingly, a pocket is formed by the upper surface of the nut chuck, the upper claw and the nut guide, so that the nut discharged from the tube at high speed can be easily and surely caught.

It is preferable that the apparatus further comprises a first magnet provided on a lower surface of the nut chuck and in a position opposite to the nut guide and a second magnet provided in a lower portion of the upper electrode, wherein the second magnet attracts the nut with a magnetic force stronger than that of the first magnet.

According to this configuration, the nut caught by the nut guide on the upper surface of the inclined nut chuck is attracted to be held by the first magnet on the lower surface of the nut chuck. When the first rod is advanced during such a held state, the direction of advance approximately coincides with the direction of incline of the upper surface of the nut chuck. Since the first rod advances approximately in the direction of incline of the surface on which the nut is held, even if the first rod is advanced at high speed, any forces spinning off the nut do not work, and therefore, the nut can be prevented from falling. Thus, speeding up of feeding nuts is achieved.

In addition, when the nut captured by the first magnet of the nut chuck rises in an arc to abut against the upper electrode, the nut is also attracted by the second magnet in the upper electrode. After that, when the nut chuck falls in an arc, the nut remains captured by the second magnet in the upper electrode, since the magnetic force of the second magnet is stronger than that of the first magnet. Accordingly, the nut can be appropriately passed to the upper electrode. Since such a delivery is performed by capturing by the second magnet in the upper electrode, a simple configuration such that the nut chuck simply moves up and down according to bidirectional rotation of the link mechanism is achieved.

Effect of Invention

In accordance with the present invention, there is provided a nut feeding apparatus that can reduce the size and the production cost of the whole apparatus.

BRIEF DESCRIPTION THE DRAWINGS

Certain preferred embodiments of the present invention will now be described in greater detail by way of example only and with reference to the accompanying drawings, in which:

FIGS. 1A to 1C show a configuration of a nut feeding apparatus 10 according to an embodiment of the present invention, wherein FIG. 1A is a side view of the nut feeding apparatus 10, FIG. 1B is an enlarged partial cross-sectional view of a portion A of FIG. 1A, showing a distal portion 24a of a nut chuck 24 of the nut feeding apparatus 10, and FIG. 1C is a plan view of a nut guide 26 fixed on the nut chuck 24 shown in FIG. 1B;

Figure 4A:
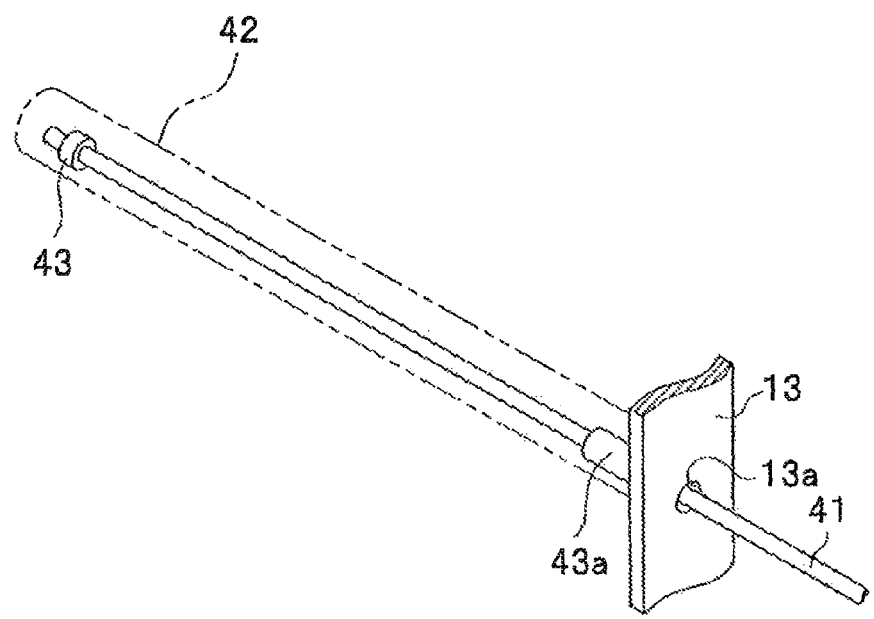
Figure 4B:
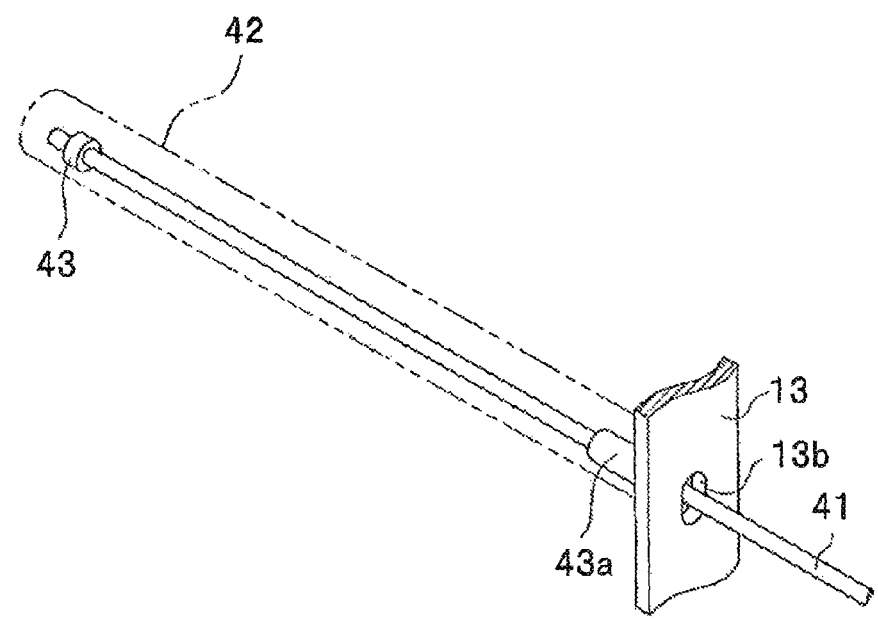
Figure 5A:
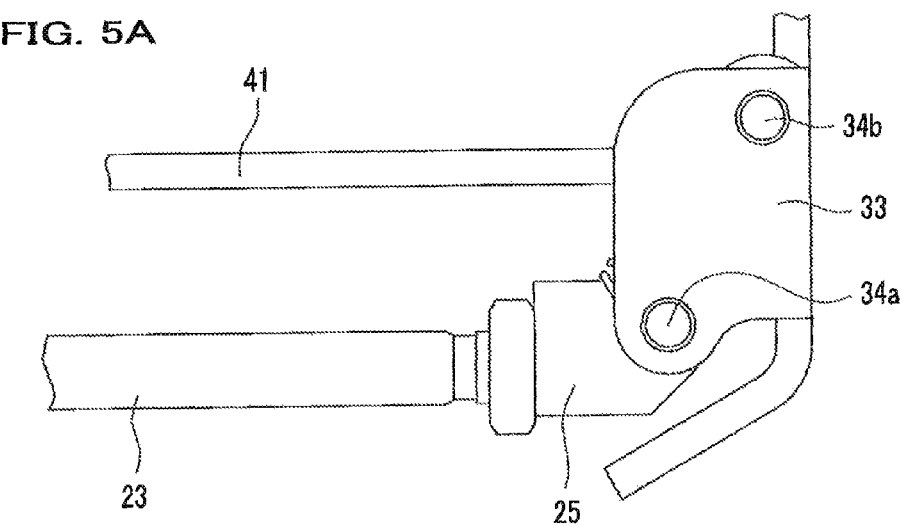
Figure 5B:
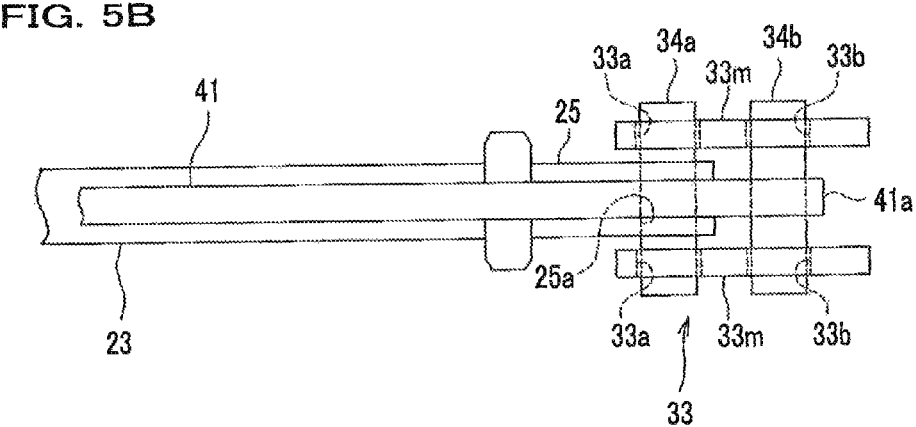
Figure 5C:
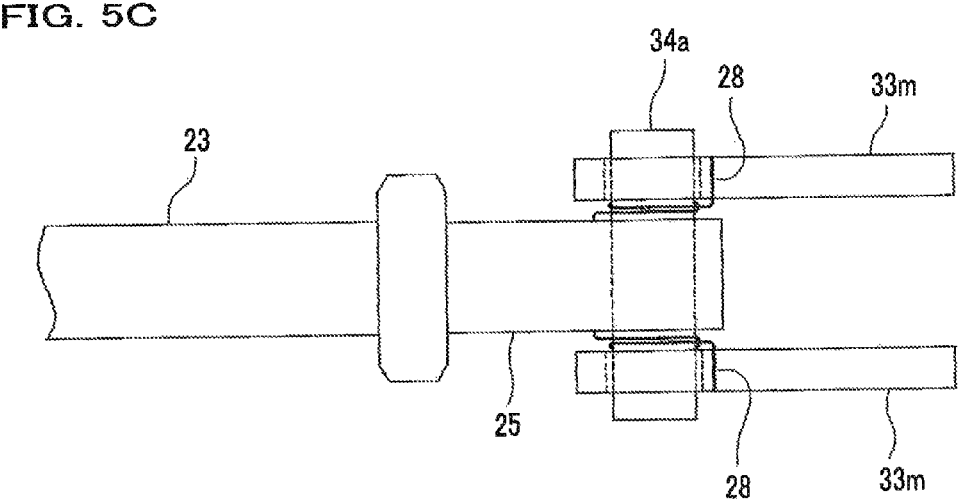
Figure 6A:
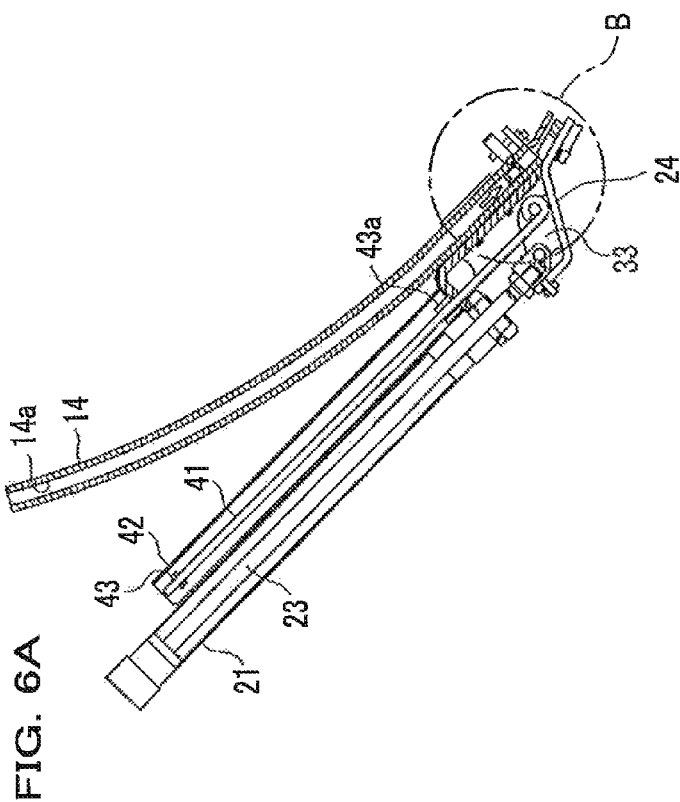
Figure 6B:
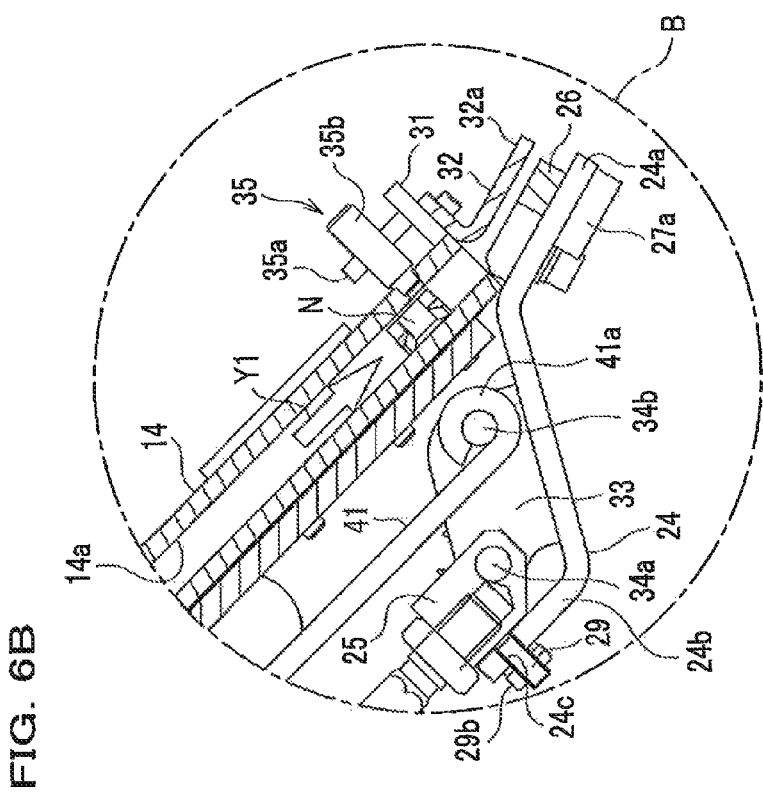
Figure 7A:
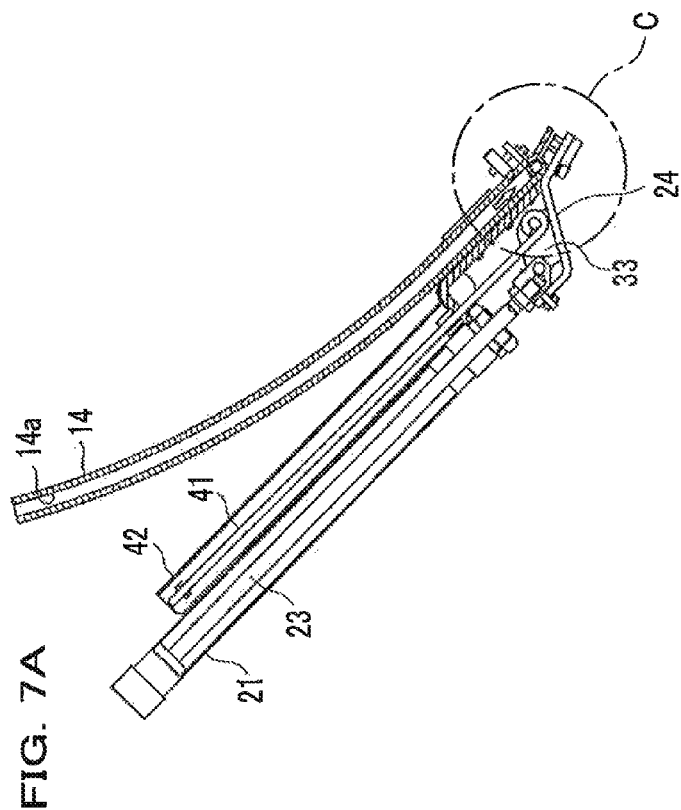
Figure 7B:
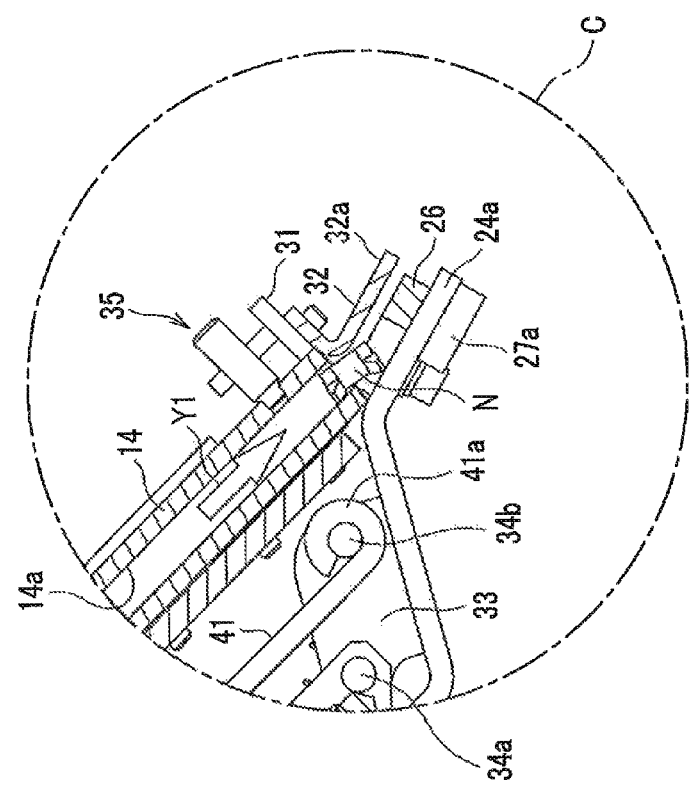
Figure 8A:
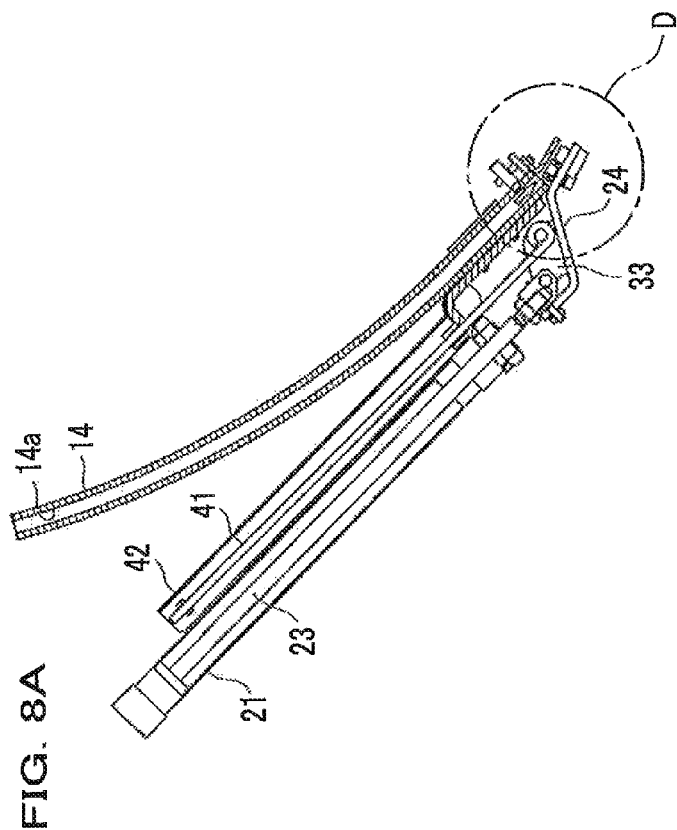
Figure 8B:
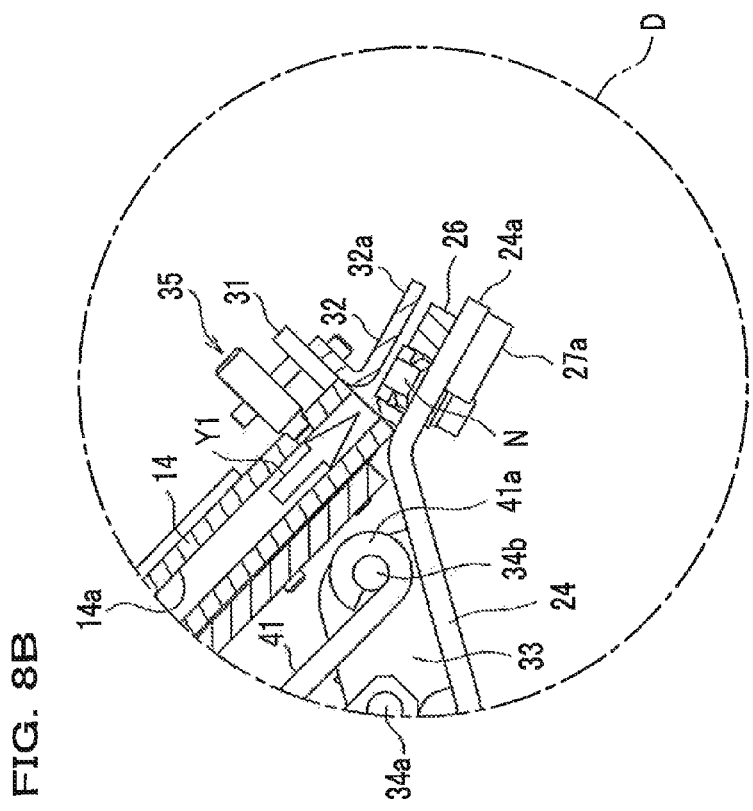
Figure 11:
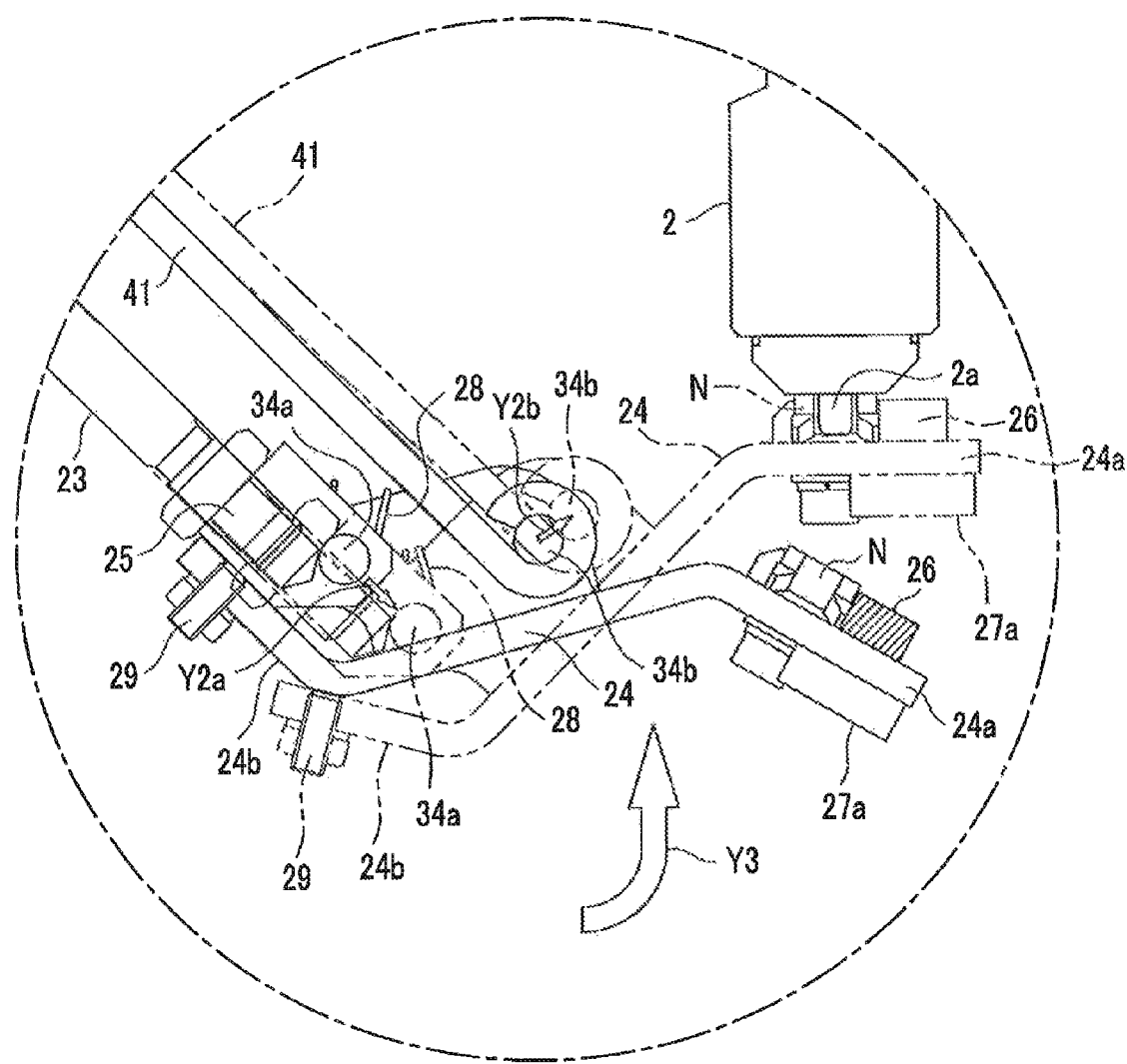
Figure 12A:
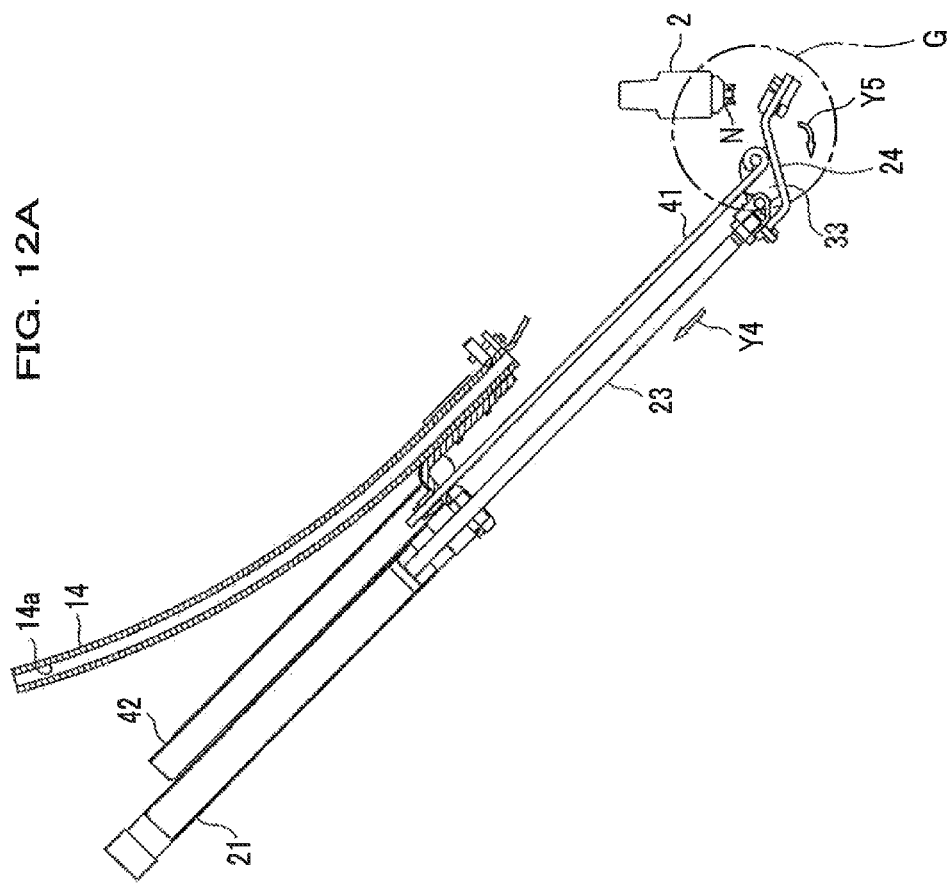
Figure 12B:
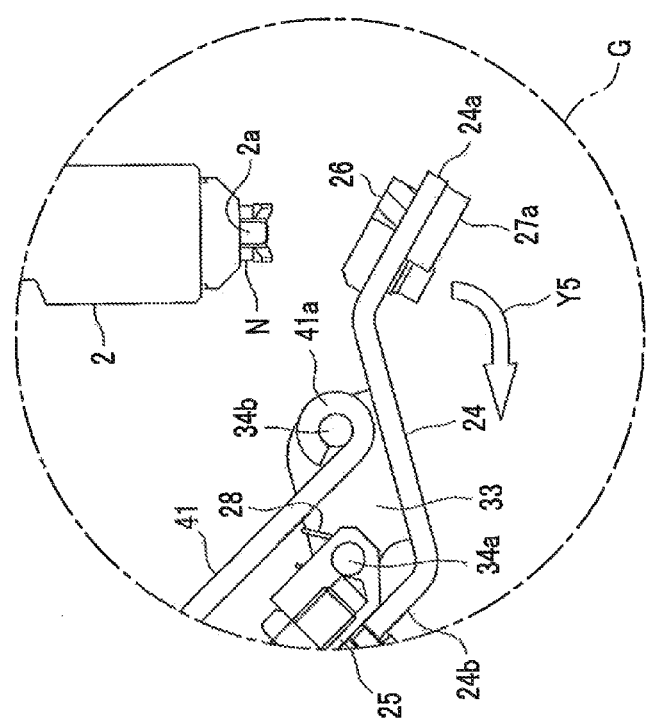
Figure 13A:
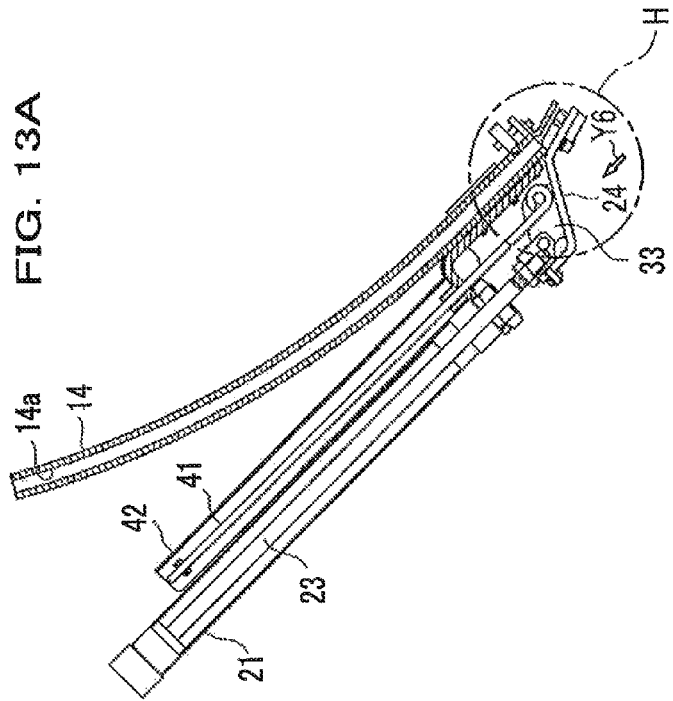
Figure 13B:
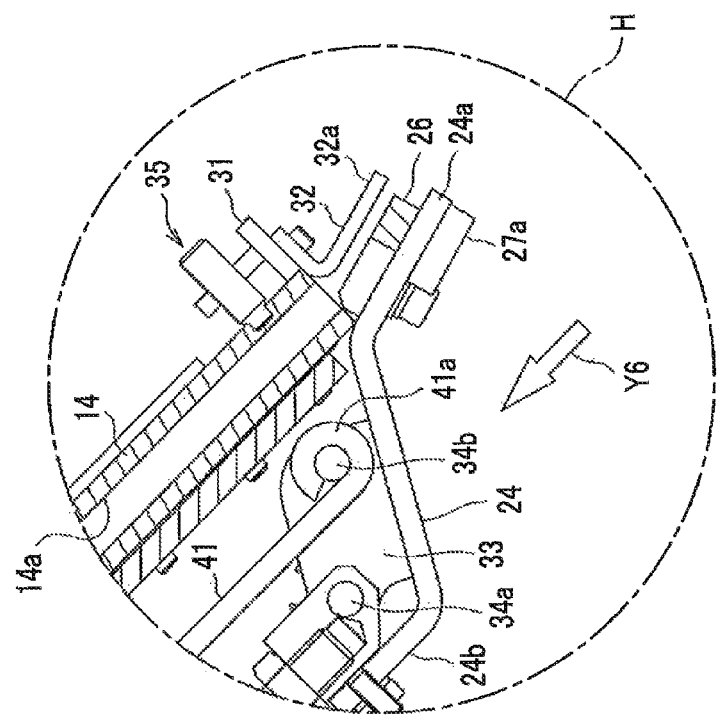

FIGS. 4A and 4B show a through hole into which a tension rod 41 of the nut feeding apparatus 10 according to the embodiment is inserted, wherein FIG. 4A is a perspective view showing a circular aperture 13a and FIG. 4B is a perspective view showing an elliptical aperture 13b;

FIGS. 5A to 5C show an attachment configuration of a rod top 25 at a distal end of a piston rod 23 and a distal portion of the tension rod 41 to a link mechanism 33 in the nut feeding apparatus of the embodiment, wherein FIG. 5A is a side view showing an attachment configuration between both walls 33m of the link mechanism 33, FIG. 5B is a top view showing the attachment configuration between both walls 33m of the link mechanism 33, and FIG. 5C is a top view showing an attachment configuration of a torsion spring 28 between both walls 33m of the link mechanism 33 sandwiching the rod top 25;

FIG. 6A and FIG. 6B show a configuration of the nut feeding apparatus according to the embodiment, wherein FIG. 6A is a first partial cross-sectional side view of a contracted piston rod 23 and a contracted tension rod 41 and FIG. 6B is a first enlarged partial cross-sectional view of a portion B of FIG. 6A, showing a nut chuck 24 attached on the link mechanism 33 and a distal portion of a nut feeding tube 14 in which a weld nut N glides;

FIG. 7A and FIG. 7B show a configuration of the nut feeding apparatus according to the embodiment, wherein FIG. 7A is a second partial cross-sectional side view of the contracted piston rod 23 and the contracted tension rod 41 and FIG. 7B is a second enlarged partial cross-sectional view of a portion C of FIG. 7A, showing the nut chuck 24 attached on the link mechanism 33 and the distal portion of the nut feeding tube 14 from which the weld nut N is discharged;

FIG. 8A and FIG. 8B show a configuration of the nut feeding apparatus according to the embodiment, wherein FIG. 8A is a third partial cross-sectional side view of the contracted piston rod 23 and the contracted tension rod 41 and FIG. 8B is a third enlarged partial cross-sectional view of a portion D of FIG. 8A, showing the nut chuck 24 attached on the link mechanism 33 and having caught the weld nut N and the distal portion of the nut feeding tube 14;

FIG. 9A and FIG. 9B show a configuration of the nut feeding apparatus according to the embodiment, wherein FIG. 9A is a fourth partial cross-sectional side view showing a conformation where the piston rod 23 is expanded and the tension rod 41 is in a most expanded state and FIG. 9B is a fourth enlarged partial cross-sectional view of a portion E of FIG. 9A, showing the distal portion 24a of the nut chuck 24 holding the weld nut N;

FIG. 10A and FIG. 10B show a configuration of the nut feeding apparatus according to the embodiment, wherein FIG. 10A is a fifth partial cross-sectional side view showing a conformation where the piston rod 23 and the tension rod 41 are in a most expanded state and FIG. 10B is a fifth enlarged partial cross-sectional view of a portion F of FIG. 10A, showing the distal portion 24a of the nut chuck 24 holding the weld nut N and being fitted to a pin 2a of an upper electrode 2;

FIG. 11 is a partial cross-sectional view showing a transition from a conformation where the tension rod 41 is in the most expanded state to a conformation where the piston rod 23 is further expanded to rotate the link mechanism 33, thereby fitting the distal portion 24a of the nut chuck 24 to the pin 2a of the upper electrode 2;

FIG. 12A and FIG. 12B show a configuration of the nut feeding apparatus according to the embodiment, wherein FIG. 12A is a sixth partial cross-sectional side view showing a conformation where the piston rod 23 is contracted and FIG. 12B is a sixth enlarged partial cross-sectional view of a portion G of FIG. 12A, showing the distal portion 24a of the nut chuck 24 leaving the upper electrode 2 that holds the weld nut N; and FIG. 13A and FIG. 13B show a configuration of the nut feeding apparatus according to the embodiment, wherein FIG. 13A is a seventh partial cross-sectional side view showing a conformation where the piston rod 23 and the tension rod 41 are in a most contracted state and FIG. 13B is a seventh enlarged partial cross-sectional view of a portion H of FIG. 13A, showing the nut chuck 24 attached to the link mechanism 33 and the distal portion of the nut feeding tube 14;

DESCRIPTION OF THE EMBODIMENTS

<Configuration of Embodiment>

Figure 1A:
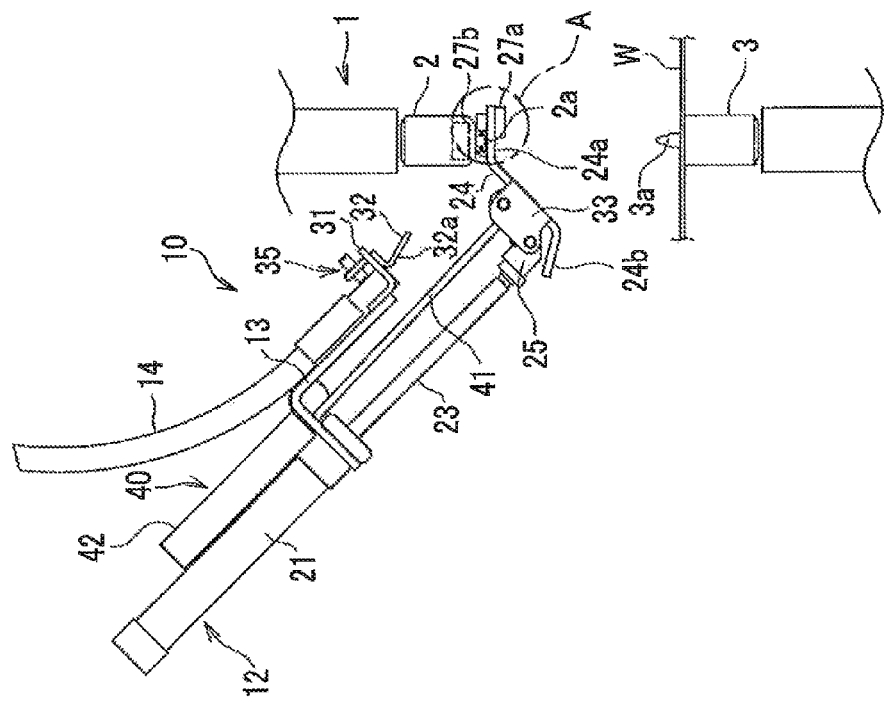
Figure 1B:
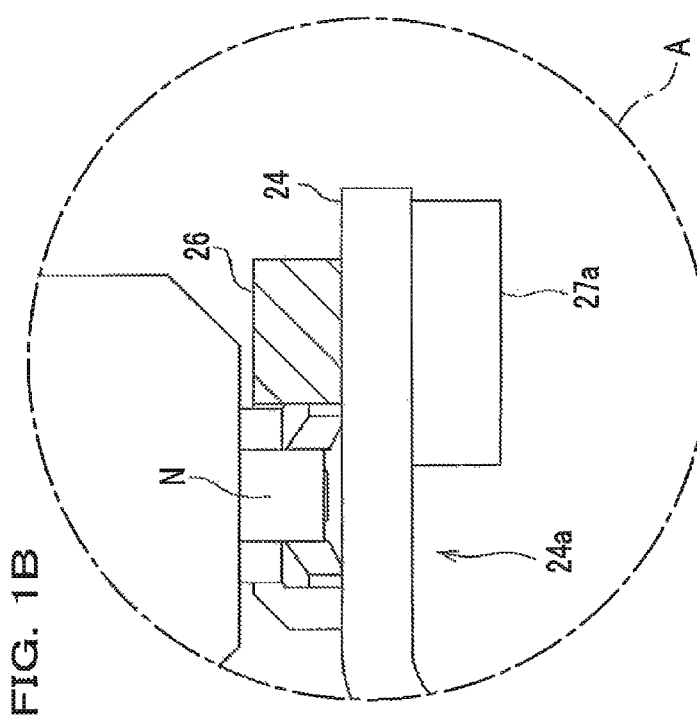
Figure 1C:
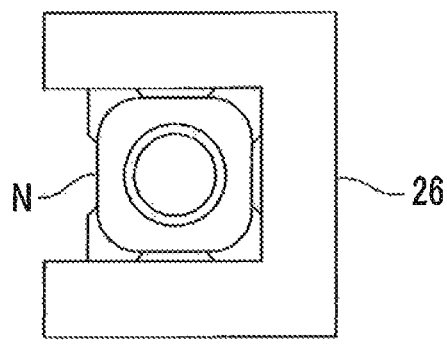
Figure 2:
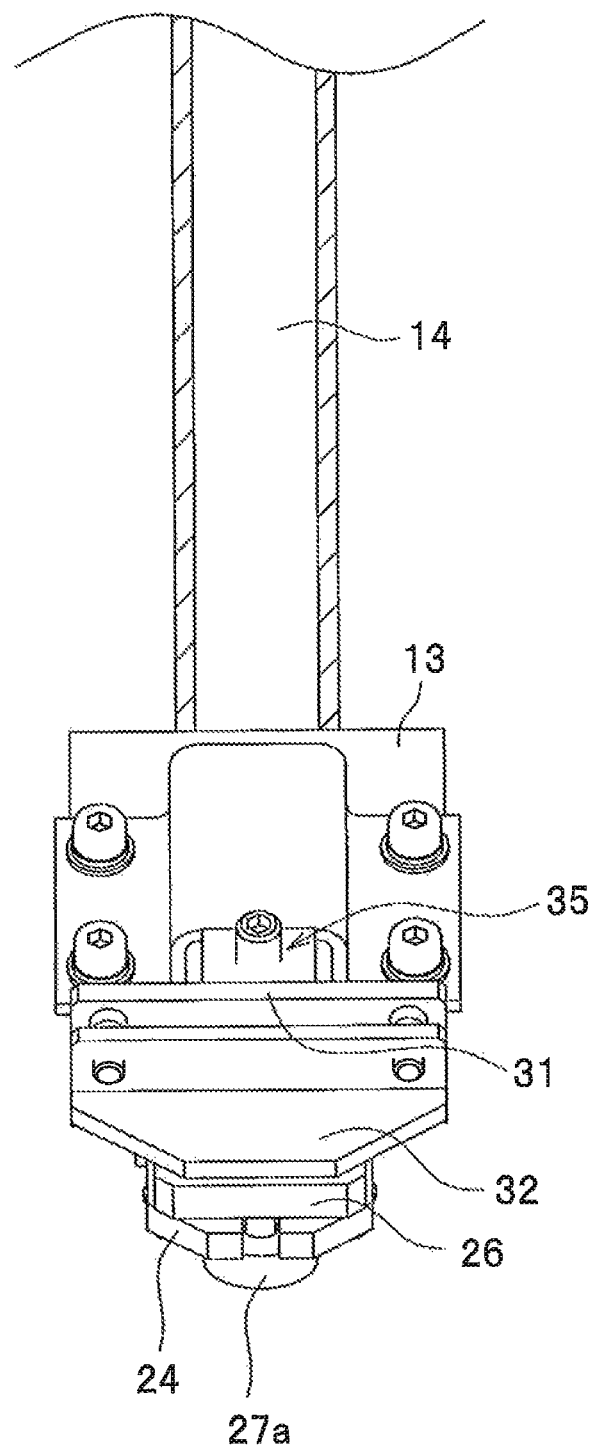
FIG. 2 is a front view showing a configuration of a distal portion of a tube 14 of the nut feeding apparatus 10 shown in FIG. 1A.

FIGS. 1A to 1C show a configuration of a nut feeding apparatus 10 according to an embodiment of the present invention, wherein FIG. 1A is a side view of the nut feeding apparatus 10, FIG. 1B is an enlarged partial cross-sectional view of a portion A of FIG. 1A, showing a distal portion 24a of a nut chuck 24 of the nut feeding apparatus 10, and FIG. 1C is a plan view of a nut guide 26 fixed on the nut chuck 24 shown in FIG. 1B. FIG. 2 is a front view showing a configuration of a distal portion of a tube 14 of the nut feeding apparatus 10 shown in FIG. 1A.

As shown in FIG. 1A, the nut feeding apparatus 10 is for feeding a weld nut N (FIG. 1B) to an upper electrode 2 of a resistance welding machine 1 having the upper electrode 2 and a lower electrode 3 facing up and down, respectively. The nut feeding apparatus 10 comprises a nut feeding advance/retract part (also called as an advance/retract part) 12 arranged in an inclined manner and having an elongated shape, a nut feeding auxiliary part (also called as an auxiliary part) 40 juxtaposed on an upper side of the advance/retract part 12 through an L-shaped base plate 13, a link mechanism 33 attached to tips of the advance/retract part 12 and the auxiliary part 40, and a nut feeding tube (also called as a tube) 14 mounted on an upper side of the auxiliary part 40 in an inclined manner through the base plate 13. The base plate 13 corresponds to the "plate" in the claims.

Figure 3A:
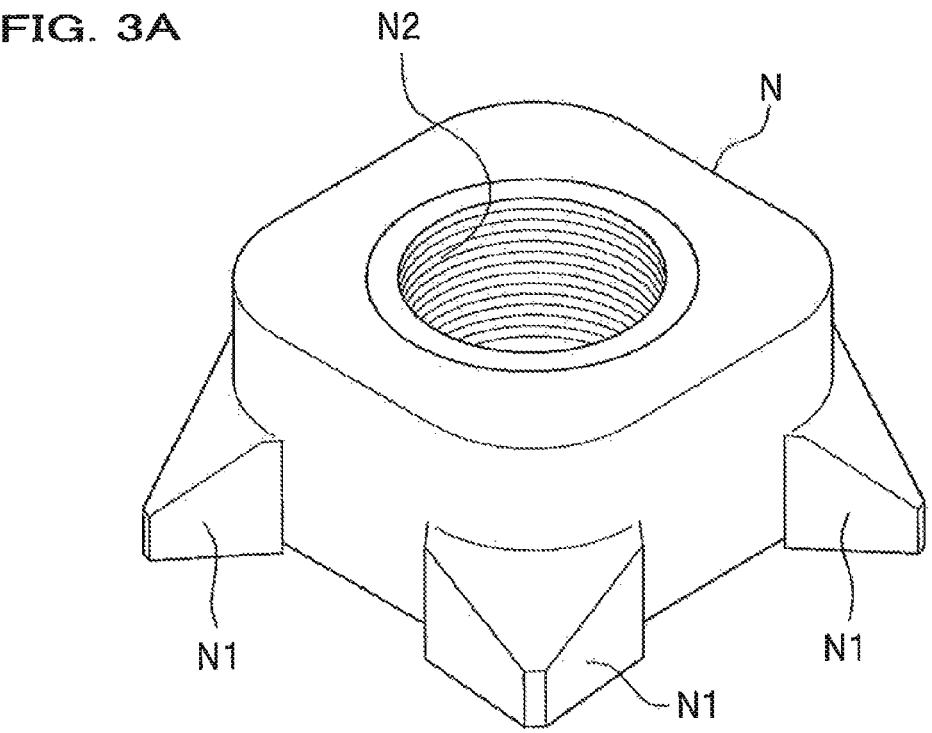
FIG. 3A is a perspective view showing an outline of a weld nut N.
Figure 3B:
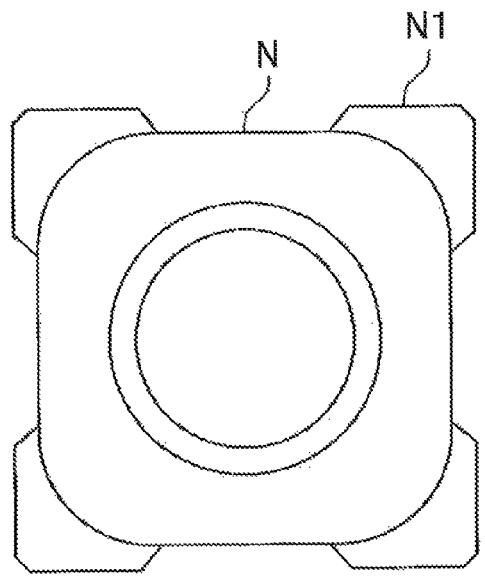
FIG. 3B is a plan view of the weld nut N.
Figure 3C:
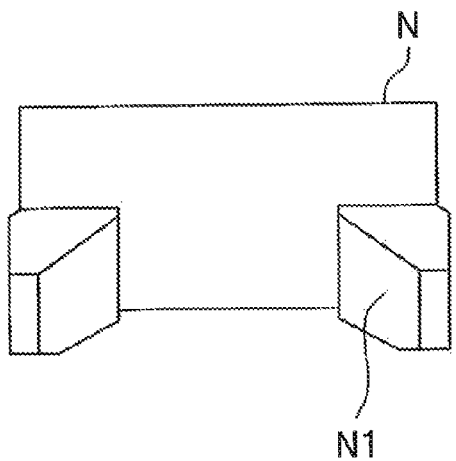
FIG. 3C is a side view of the weld nut N.

The weld nut N has an outline having a substantially rectangular shape, as shown in the perspective view of FIG. 3A, which has projections N1 projecting at four corners of the rectangular shape as also shown in a plan view of FIG. 3B and a side view of FIG. 3C. Each of the projections N1 is to be welded to a work W of an iron plate or the like which is fitted to a lower guide pin (also called as a lower pin) 3a of the lower electrode 3 as shown in FIG. 1A. Further, a screw hole N2 passing through up and down is formed at a center of the rectangular shape as shown in FIG. 3A.

The nut feeding advance/retract part 12 shown in FIG. 1A comprises an air cylinder 21, a piston rod 23, a rod top 25 and a nut chuck 24. The auxiliary part 40 comprises a tension rod 41 and a rod cover 42.

The air cylinder 21 has a hollow cylindrical shape and a rod-like piston rod 23 is movably (in a freely advancing and retracting manner) inserted to be incorporated therein. The piston rod 23 is formed by a rod made of a material of iron or the like which is difficult to bend, rotation of which relative to the air cylinder 21 is inhibited by a stopper mechanism. Alternatively, a polygonal column rod may be used as the piston rod 23 and a shape of a doorway of the air cylinder 21 may be matched with the shape of the polygonal column rod, to thereby inhibit rotation of the piston rod 23 relative to the air cylinder 21.

The rod cover 42 is juxtaposed on the air cylinder 21. The rod cover 42 has a hollow cylindrical shape and a rod-like tension rod 41 is movably (in a freely advancing and retracting manner) inserted to be incorporated therein.

The tension rod 41 is formed by a metal rod or the like having a small diameter. As shown in FIG. 4A, the tension rod 41 is movably inserted into a through hole 13a provided in the base plate 13, to be accommodated in the rod cover 42. At a proximal end of the tension rod 41 inside the rod cover 42, a stopper 43 for limiting movement of the tension rod 41 in cooperation with a cushion member 43a made of urethane or the like is fixed to the rod 41 so as to surround it. The stopper 43 and the cushion material 43a have a diameter larger than that of the through hole 13a.

In addition, the through hole 13a provided in the base plate 13 has a size sufficient for the tension rod 41 to be able to move up and down over a predetermined length. The through hole 13a may have a vertically long elliptical shape as shown by the reference numeral 13b in FIG. 4B or may have another shape such as a rectangular shape or a rhombus, etc. which is not shown, provided that the tension rod 41 can move up and down over the predetermined length and that the hole is smaller than the stopper 43.

Since the tension rod 41 is simply inserted into the through hole 13a, the tension rod 41 might be rotatable as far as viewing only this insertion structure. However, a distal portion of the tension rod 41 is linked through the link mechanism 33 to the rod top 25 at an end of the piston rod 23 which has a structure for inhibiting rotation as mentioned above. By virtue of a combination with such a piston rod 23, the rotation of the tension rod 41 is also inhibited.

When the air is introduced into the air cylinder 21 shown in FIG. 1A to be compressed, the piston rod 23 is extruded by the compressed air, and inversely, when the compressed air is pulled out from the air cylinder 21, the piston rod 23 retracts to be contracted as shown in FIG. 6A. Returning to FIG. 1A, since the rod top 25 at the end of the piston rod 23 and the distal portion of the tension rod 41 are linked to each other by the link mechanism 33, the tension rod 41 expands or contracts in response to expansion or contraction of the piston rod 23. The piston rod 23 corresponds to the "first rod" in the claims and the tension rod 41 corresponds to the "second rod" in the claims.

The piston rod 23 and the tension rod 41 shown in FIG. 1A represent a conformation where both rods 23, 41 are in a most advancing and expanded state. Inversely, the piston rod 23 and the tension rod 41 shown in a partial cross-sectional view of FIG. 6A represent a conformation where both rods 23, 41 are in a most retracting and contracted state.

The rod top 25 is fixed at the end of the piston rod 23 as shown in FIG. 1A, and the link mechanism 33 is attached to both of the rod top 25 and the distal portion of the tension rod 41 rotatably in an arc. An action of the link mechanism 33 rotating in an arc is called as a link action.

The link mechanism 33 will be further explained in detail with reference to FIGS. 5A to 5C. FIG. 5A is a side view of the link mechanism 33 and attached portions of the piston rod 23 and the tension rod 41, and FIG. 5B is a top view of FIG. 5A. As shown in FIG. 5B, the link mechanism 33 sandwiches the rod top 25 and the distal portion of the tension rod 41 from both sides thereof, and in both walls 33$m$ of the link mechanism 33, first through holes 33$a$ and second through holes 33$b$ penetrating the walls 33$m$ are formed apart from each other. Also, a through hole 25$a$ is formed in the rod top 25.

A hinge pin 34$a$ is inserted into the through hole 25$a$ of the rod top 25 and the first through holes 33$a$ of the walls 33$m$ so as to provide a linked state. In addition, an end of the tension rod 41 is circularly bent as shown by the reference numeral 41$a$ in FIG. 6B. This bent portion is called as a circularly bent portion 41$a$. Returning to FIG. 5B, a hinge pin 34$b$ is inserted into a hole of the circularly bent portion 41$a$ and the second through holes 33$b$ of the walls 33$m$ so as to provide a linked state. In this way, the link mechanism 33 links the rod top 25 and the distal portion 41$a$ of the tension rod 41 to each other. In addition, the first through holes 33$a$ and the second through holes 33$b$ are apart from each other by a distance such that the piston rod 23 and the tension rod 41 linked to each other through the through holes 33$a$, 33$b$ are substantially in parallel with each other as shown in FIG. 6A when the piston rod 23 and the tension rod 41 retract.

Furthermore, as shown in FIG. 5C, a torsion spring 28 is provided between the rod top 25 and both of the walls 33$m$. As shown in FIG. 10B, a repulsive force directed inversely to a direction indicated by an arrow Y3 stays in the torsion spring 28, in a position where the distal portion 24$a$ of the nut chuck 24 (explained later) fixed to the link mechanism 33 supplies a weld nut N to the upper electrode 2. When the piston rod 23 contracts from this position so that the nut chuck 24 leaves the upper electrode 2 as indicated by an arrow Y5 shown in FIG. 12B, the torsion spring 28 plays a role to aid this leaving action by the above repulsive force. In addition, the torsion spring 28 also plays a role to eliminate rattling of the link mechanism 33.

The nut chuck 24 is formed by a metal plate or the like (for example, a metal plate) having a side geometry in which the metal plate is bent similar to a shape of a crank and is fixed to a side face of the link mechanism 33 bellow the walls 33$m$. The expression "a shape of a crank" means a shape in which a distal portion and a proximal portion thereof are bent symmetrically relative to a straight line axis at a predetermined angle.

Furthermore, the nut chuck 24 is fixed on the link mechanism 33 so that the distal portion 24$a$ becomes level by the link actions of the link mechanism 33 when the piston rod 23 is most expanded as shown in FIG. 1A. A state where the distal portion 24$a$ is "level" means a state where the distal portion 24$a$ is in parallel with a horizontal floor (reference surface) on which the nut feeding apparatus 10 is installed.

As for the distal portion 24$a$, a nut guide 26 having a C-shaped (see FIG. 1C) cross-section which a weld nut N can enter is provided on an upper surface thereof and a permanent magnet 27$a$ opposite to the nut guide 26 is fixed on a lower surface thereof. The distal portion 24$a$ is arranged so as to be placed on an outlet side of the inclined tube 14 in a manner inclined along a tilt of the tube 14 when the piston rod 23 is most contracted, as shown in FIG. 6B. A nut pusher 32 lies above the nut guide 26 through a certain gap.

The nut feeding tube 14 on which the nut pusher 32 is fixed will be explained. The tube 14 feeds weld nuts N to the nut guide 26 of the nut chuck 24 at constant intervals as indicated by an arrow Y1 in FIG. 6B by air pressure from a compressor (not shown). The tube 14 has a rectangular cross-section and has a cavity 14$a$ whose cross-section has a size sufficient for the weld nuts N to be able to glide (move) down as indicated by an arrow Y1. Both ends of the cavity 14$a$ are opened. On an upper portion of an aperture on the distal side of the tube 14, a substantially L-shaped nut pusher 32 is fixed by a fixing member 31.

In addition, a bracket 35 is fixed on a surface opposite to a surface of the fixing member 31 on which the nut pusher 32 is fixed. The bracket 35 is for suppressing vibration and deviation of the tube 14 occurring when the weld nuts N fall down in the tube 14. The bracket 35 is attached to a plate 35$a$ projecting in parallel with the tube 14 from the fixing member 31 so that a cylindrical portion 35$b$ of the bracket 35 is perpendicular to the tube 14. A tip of the cylindrical portion 35$b$ is embedded into an outer surface of the tube 14. The vibration and deviation of the tube 14 is suppressed by such configured bracket 35. A front view of a configuration consisting of the nut pusher 32, the fixing member 31, the bracket 35, the base plate 13 and the tube 14 is as shown in FIG. 2 (tube 14 is shown as a cross-section).

The nut pusher 32 has a portion bent from a portion fixed to the fixing member 31 by at least 90 degrees to project toward a distal side, as shown in FIG. 7B. Such a projecting portion is called as an upper claw 32$a$. When the piston rod 23 is in the most retracting state, the upper claw 32$a$ is substantially in parallel with the distal portion 24$a$ of the nut chuck 24 as shown in FIG. 6B. A distance between the upper claw 32$a$ and the distal portion 24$a$ is slightly larger than a height of the weld nut N so that the weld nut N discharged from the tube 14 at a predetermined rate can penetrate, as shown in FIG. 7B and FIG. 8B.

Accordingly, when the piston rod 23 is in the most retracting state as shown in FIG. 6B, a weld nut N gliding in the tube 14 is discharged from the tube 14 as shown in FIG. 7B, caught by the nut guide 26 between the distal portion 24$a$ of the nut chuck 24 and the upper claw 32$a$ as shown in FIG. 8B, and captured by a magnetic force of the magnet 27$a$. At this time, although the weld nut N rushes out from the tube 14 to the nut guide 26 at a predetermined rate, the weld nut N does not jump to fall on a floor by virtue of the upper claw 32$a$.

In addition, since the nut guide 26 is arranged between the distal portion 24$a$ and the upper claw 32$a$ which are arranged along an orbit of discharged weld nuts N in an inclined manner, a pocket is formed by the distal portion 24$a$, upper claw 32$a$ and the nut guide 26 to facilitate the catching of the weld nut N. In this configuration, the distal portion 24$a$ on which the nut guide 26 is fixed inclines in a direction of extension of the piston rod 23 and the weld nut N is captured on a surface of the distal portion 24$a$ which is so inclined by the magnetic force of the magnet 27$a$ arranged on a back surface thereof. By virtue of such inclined capture, the weld nut N is not likely to fall even if the piston rod 23 expands at high speed, as understood from FIG. 9A.

In addition, as shown in FIG. 6B, a positioning screw 29 for positioning the distal portion 24$a$ is attached to a proximal portion 24$b$ of the nut chuck 24. The positioning screw 29 is screwed to a screw hole 24$c$ formed through the proxy mal portion 24$b$, together with a nut 29$b$. A tip of the positioning screw 29 projects to a side surface of the rod top 25 and a position of the distal portion 24$a$ of the nut chuck 24 when the piston rod 23 is in the most retracting state can be adjusted up and down by adjusting projection of the positioning screw 29. When the positioning screw 29 projects long, the distal portion 24 moves up, and when the positioning screw 29 does not project, the distal portion 24a is located on a lower side. In this way, the weld nut N can be appropriately discharged from the tube 14 to the nut guide 26.

FIG. 9A shows a state where expansion of the tension rod 41 is stopped by the stopper 43 abutting against the base plate 13 through the cushion member 43a, which corresponds to a state where the tension rod 41 is the most expanded. When the stopper 43 collides with the base plate 13, the cushion member 43a absorbs the shock of the collision since the stopper 43 abuts against the base plate 13 through the cushion member 43a. Accordingly, vibrations caused by a shock given to a whole advance/retract part 12 when the tension rod 41 is most expanded can be suppressed.

In addition, when the tension rod 41 is in the most expanded state, the distal portion 24a of the nut chuck 24 is arranged between the upper electrode 2 containing a permanent magnet (also called as a magnet) 27b (see FIG. 1) of the resistance welding machine 1 and the lower electrode 2 in an inclined manner. At this time, the piston rod 23 has a room to expand. The magnet 27a corresponds to the "first magnet" in the claims and the magnet 27b corresponds to the "second magnet" in the claims.

When the piston rod 23 further advances and expands as indicated by an arrow Y2 shown in FIG. 10A, the link mechanism 33 rotates around the hinge pin 34b as a rotation axis and the nut chuck 24 also rotates, as indicated by an arrow Y3 in FIG. 10B. During this rotation, as indicated by an arrow Y2a and depicted by two-dot chain lines in FIG. 11, only the piston rod 23 slightly advances, but the tension rod 41 cannot advance since the stopper 43 (FIG. 9A) abuts against the base plate 13.

Therefore, when the piston rod 23 advances (arrow Y2a), the nut chuck 24 rotates counterclockwise in the drawing around the hinge pin 34b as the rotation axis. At this time, since the piston rod 23 is a rod which is difficult to bend, a force originated from this piton rod 23 and transferred through the above rotation is applied to the circularly bent portion 41a at the tip of the tension rod 41 to lift it up.

A proximal side of the tension rod 41 is inserted into the through hole 13a of the base plate 13 (FIG. 4A) movably up and down. Accordingly, if the force lifting up the tip of the tension rod 41 is applied, the proximal side of the tension rod 41 moves down. Therefore, the circularly bent portion 41a of the tension rod 41 moves obliquely upward, as indicted by an arrow Y2b and depicted by two-dot chain lines in FIG. 11. Thus, the whole of the link mechanism 33 and the nut chuck 24 slightly move upward through the link action as indicated by an arrow Y3

If the through hole 13a into which a proximal portion of the tension rod 41 is inserted does not have a size sufficient for the proximal portion to move up and down, the tension rod 41 may be formed by a rod made of a material or having a thickness adequate for flexing and recovering. In this case, when the force lifting up the tip of the tension rod 41 is applied as mentioned above, the tension rod 41 flexes downward approximately in the central section thereof and the circularly bent portion 41a of the tension rod 41a moves obliquely upward (arrow Y2b) similarly to the above.

As the distal portion 24a of the nut chuck 24 moves obliquely upward through the above link action, the weld nut N held by the magnet 27a in the distal portion 24a is fitted to an upper pin 2a (see FIG. 9B) projecting downward from a lower surface of the upper electrode 2. The fitted weld nut N is also captured by the magnet 27b contained in the upper electrode 2. At this time, since a front end of the nut chuck 24 moves upward, the weld nut N is fitted to the upper pin 2a more easily than in a case where the nut chuck 24 rotates while the rotation axis 34b at the tip of the tension rod 41 does not move.

A magnetic force of the magnet 27b is stronger than that of the magnet 27a arranged on a lower surface of the nut chuck 24 in a predetermined degree. The magnetic force of the magnet 27b is sufficient for the weld nut N fitted to and captured by the upper pin 2a to stay on a side of the upper electrode 2 and to leave the nut chuck 24 when the piston rod 23 retracts as indicated by an arrow Y4 in FIG. 12A and the distal portion 24a of the nut chuck 24 leaves the upper electrode 2 as indicated by an arrow Y5 in FIG. 12B.

<Operation of Embodiment>

Actions performed when feeding weld nuts N to an upper electrode 2 of a resistance welding machine 1 by a nut feeding apparatus 10 according to the embodiment are explained.

As an initial state, it is assumed that a piston rod 23 of a nut feeding advance/retract part 12 in the nut feeding apparatus 10 is in a most retracting and contracted state as shown in FIGS. 6A and 6B. Accordingly, an upper surface of a distal portion 24a of a nut chuck 24 is substantially flush with a lower portion of an opening of a tube 14 in an inclined manner.

In this situation, it is assumed that one of weld nuts N successively fed at constant intervals glides in a tube 14 to come, as indicated by an arrow Y1. The weld nut N is discharged from the tube 14 as shown in FIG. 7B, caught by a nut guide 26 between the distal portion 24a of the nut chuck 24 and an upper claw 32a as shown in FIG. 8B, and captured with a magnetic force of a magnet 27a. At this time, although the weld nut N rushes out from the tube 14, the weld nut N surely enters a pocket formed by the distal portion 24a, the upper claw 32a and the nut guide 26 and is captured by a magnet 27a.

Next, it is assumed that the piston rod 23 is extruded by an air cylinder 21 at high speed, and the distal portion 24a of the nut chuck 24 on a distal side of the piston rod 23 is arranged between an upper electrode 2 and a lower electrode 3 as shown in FIG. 9A. At this time, since the distal portion 24a is inclined and the weld nut N is captured on the nut guide 26 on a surface thereof through the magnet 27a, the weld nut N does not drop out even though the piston rod 23 expands at high speed.

Next, when the piston rod 23 further advances to be expanded as indicated by an arrow Y2 in FIG. 10A while the tension rod 41 is in the most advancing and stopped state, i.e., when the piston rod 23 advances as indicated by an arrow Y2a in FIG. 11, a link mechanism 33 rotates counterclockwise around a hinge pin 34b as a rotation axis, as shown by two-dot chain lines, and the nut chuck 24 also rotates similarly. During this rotation, only piston rod 23 slightly advances (arrow Y2a), but the tension rod 41 cannot advance because a stopper 43 (FIG. 9A) abuts against a base plate 13 through a cushion member 43a.

However, since the piston rod 23 is a rod which is difficult to bend, a force originated from this piton rod 23 and transferred through the above rotation of the link mechanism 33 is applied to a circularly bent portion 41a at the tip of the tension rod 41 to lift it up, and the circularly bent portion 41a moves obliquely upward as indicted by an arrow Y2b. Thus, a whole of the link mechanism 33 and the nut chuck 24 slightly move upward through the link action as indicated by an arrow Y3.

By this movement, the weld nut N held in the nut guide 26 on the distal portion 24a by a magnet 27a is fitted to an upper pin 2a projecting downward from a lower surface of an upper electrode 2 (see FIG. 9B). At this time, the weld nut N is captured also by a magnet 27b contained in the upper electrode 2. Since the link operation of the link mechanism 33 up to this capturing is performed through an action of the piston rod 23 advancing at high speed, the link operation is also performed at high speed.

Since the magnetic force of the magnet 27b in the upper electrode 2 is stronger than that of the magnet 27a arranged on a lower surface of the distal portion 24a in a predetermined degree, when the distal portion 24a moves down to leave as indicated by an arrow Y5 shown in FIG. 12B, the weld nut N fitted to the pin 2a to be captured thereby leaves the distal portion 24a and stays captured by the upper electrode 2.

When the piston rod 23 is retracted by the air cylinder 21 as indicated by an arrow Y6 in FIG. 13A, the piston rod 23 is contracted to the most retracted position as shown in FIG. 13B. In this state, feeding of the weld nut N as mentioned above is started again. Above operations are repeated.

<Effect of Embodiment>

As explained above, the nut feeding apparatus 10 according to the embodiment is for feeding a weld nut N to an upper electrode 2 of a resistance welding machine 1 and comprises a piston rod 23 advanced and retracted by an air cylinder 21, a tension rod 41 arranged above the piston rod 23 and advancing/retracting in conjunction with the piston rod 23. The apparatus further comprises a tube 14 pneumatically feeding the weld nut N, a link mechanism 33 rotatably attached to a tip of the piston rod 23 and to a tip of the tension rod 43 using rotation axes 34a and 34b, respectively, and a nut chuck 24 fixed to the link mechanism 33 on a forward side thereof and having a nut guide 26 on an upper surface of the nut chuck 24 for catching and holding the weld nut N fed by the tube 14. While the tension rod 41 is at a stop in the most advancing state and when the piston rod 23 further advances, the link mechanism 33 rotates around the rotation axis 34b fixed to the tip of the tension rod 41 so that the weld nut N held by the nut guide 26 is fed to the upper electrode 2.

According to the above configuration, the nut feeding apparatus 10 can be implemented by using only one air cylinder 21 and by juxtaposition of slightly inclined two rods 23, 41 and a tube 14. There is no component extending up and down. Therefore, few parts are used and the whole apparatus can be downsized, and thus, size and production cost of whole nut feeding apparatus 10 can be reduced.

The tip of the tension rod 41 is preferably arranged in the link mechanism 33 in more advancing position than the tip of the piston rod 23 (a tip of a rod top 25), and thereby, the rotation axis 34b at the tip of the tension rod 41 preferably moves upward while the tension rod 41 is at a stop in the most advancing state and when the piston rod 23 further advances.

According to this configuration, as a front end of the nut chuck 24 moves upward, the weld nut N is fitted to the upper pin 2a more easily than in a case where the nut chuck 24 rotates while the rotation axis 34b at the tip of the tension rod 41 does not move.

It is preferable that the tension rod 41 is supported by being inserted into a through hole 13a formed in a base plate 13 fixed to the air cylinder 21 and extending upward, and that the through hole 13a (or 13b) has a shape sufficient for the tension rod 41 inserted into the through hole 13a to be able to move up and down over a predetermined length.

According to this configuration, while the tension rod 41 which advances in response to advance of the piston rod 23 linked through the link mechanism 33 to the tension rod 41 stops advance due to abutting of the stopper 43 of the tension rod 41 against the base plate 13 and when the piston rod 23 further advances, the link mechanism 33 rotates around the rotation axis 31b at the tip 41a (a circularly bent portion 41a) of the tension rod 41 since the tension rod 41 stops advance. At this time, a force lifting up the tip 41a of the tension rod 41 works through the rotation of the link mechanism 33.

Since a proximal side of the tension rod 41 is inserted into the through hole 13a of the base plate 13 movably up and down, the proximal side of the tension rod 41 moves downward when the aforementioned lifting force is applied to the tip 41a of the tension rod 41. Accordingly, the rotation axis 34b at the tip 41a of the tension rod 41 moves obliquely upward. Thus, both of the link mechanism 33 and the nut chuck 24 slightly move upward while rotating. In other words, an action of both going down once is eliminated. Therefore, the weld nut N held by the nut guide 26 of the nut chuck 24 can be efficiently fed to the upper electrode 2.

The tension rod 41 may also be formed by a rod made of a material that flexes and recovers.

According to this configuration, when the force lifting up the rotation axis at the tip of the tension rod 41 is applied as mentioned above, the tension rod 41 flexes downward approximately in the central section thereof and the rotation axis at the tip of the tension rod 41 moves obliquely upward. Accordingly, the weld nut N held by the nut guide 26 of the nut chuck 24 can be efficiently fed to the upper electrode 2.

The apparatus preferably comprises an upper claw 32a provided on an upper portion of an opening of the tube 14. The upper claw extends in a direction of discharging nuts. When the piston rod 23 is in the most retracted state, an upper surface of the nut chuck 24 becomes substantially flush with a lower portion of the opening of the tube 14 in a manner inclined along an orbit of the weld nut N fed by the tube 14 and the upper claw 32a is arranged above the upper surface of the nut chuck 24 and spaced apart therefrom by a predetermined distance.

According to this configuration, when the piston rod 23 is in the most retracted state, the nut guide 26 is arranged between the upper surface of the upper portion of the nut chuck 24 inclined along a discharge orbit of the weld nut N and the upper claw 32a. Accordingly, a pocket is formed by the upper surface of the nut chuck 24, the upper claw 32a and the nut guide 26, so that the weld nut N discharged from the tube 14 at high speed can be easily and surely caught.

In addition, the apparatus preferably comprises a first magnet 27a provided on a lower surface of the nut chuck 24 and in a position opposite to the nut guide 26 and a second magnet 27b provided in a lower portion of the upper electrode 2. The second magnet 27b captures the weld nut N with the magnetic force stronger than that of the first magnet 27a.

According to this configuration, the weld nut N caught by the nut guide 26 on the upper surface of the inclined nut chuck 24 is attracted to be held by the first magnet 27a on the lower surface of the nut chuck 24. When the piston rod 23 is advanced during such a held state, the direction of advance approximately coincides with the direction of incline of the upper surface of the nut chuck 24. Since the piston rod 23 advances approximately in the direction of incline of the surface on which the nut is held, even if the piston rod 23 is advanced at high speed, any forces spinning off the weld nut N do not work, and therefore, the weld nut N can be prevented from falling. Thus, speeding up of feeding nuts is achieved.

In addition, when the weld nut N captured by the first magnet 27a of the nut chuck 24 rises in an are to abut the upper electrode 2, the weld nut N is captured also by the second magnet 27b in the upper electrode 2. After that, when the nut chuck 24 falls in an arc, the weld nut N remains captured by the second magnet 27b in the upper electrode 2, since the magnetic force of the second magnet 27b is stronger than that of the first magnet 27a. Accordingly, the weld nut N can be appropriately passed to the upper electrode 2. Since such a delivery is performed by capturing by the second magnet 27b in the upper electrode 2, a simple configuration such that the nut chuck 24 simply moves up and down according to bidirectional rotation of the link mechanism 33 is achieved.

As for more detailed configuration, appropriate modification is possible without departing from the scope of the present invention. The weld nuts may be general various nuts and may be annular metal members made of magnetic materials, other than the nuts.

DESCRIPTION OF REFERENCE NUMERALS 1 resistance welding machine
2 upper electrode
2a upper guide pin
3 lower electrode
3a lower guide pin
10 nut feeding apparatus
12 nut feeding advance/retract part (advance/retract part)
13 base plate
13a, 13b through holes
14 nut feeding tube (tube)
14a cavity
21 air cylinder
23 piston rod
24 nut chuck
24a distal portion
24b proximal portion
25 rod top
26 nut guide
27a permanent magnet (first magnet)
27b permanent magnet (second magnet)
28 torsion spring
29 positioning screw
31 fixing member
32 nut pusher
32a upper claw
33 link mechanism
33m wall of link mechanism
34a, 34b rotation axes (hinge pins)
35 bracket
35a plate
35b cylindrical portion
40 nut feeding auxiliary part
41 tension rod
41a circularly bent portion
42 rod cover
43 stopper
43a cushion member
N weld nut
W work

The invention claimed is:

1. A nut feeding apparatus for feeding a nut to an upper electrode of a resistance welding machine, comprising:
   a first rod advanced and retracted by an air cylinder;
   a second rod arranged above the first rod and advancing/retracting in conjunction with the first rod;
   a tube pneumatically feeding the nut;
   a link mechanism rotatably attached to a tip of the first rod and to a tip of the second rod using a first rotation axis and a second rotation axis, respectively; and
   a nut chuck fixed to the link mechanism on a forward side of the link mechanism and having a nut guide on an upper surface of the nut chuck, the nut guide being for catching and holding the nut fed by the tube, wherein
   the link mechanism rotates around the second rotation axis while the second rod is at a stop in a most advanced state and when the first rod further advances, to feed the nut held by the nut guide to the upper electrode,
   the tip of the second rod is arranged in the link mechanism in a more advanced position than the tip of the first rod, and
   the second rotation axis moves upward while the second rod is at a stop in the most advanced state and when the first rod further advances.

2. The nut feeding apparatus as claimed in claim 1, wherein
   the second rod is formed by a rod made of a material that flexes and recovers.

3. The nut feeding apparatus as claimed in claim 1, wherein
   the second rod is supported by being inserted into a through hole formed in a plate fixed to the air cylinder and extending upward, and
   the through hole has a shape sufficient for the second rod inserted into the through hole to be able to move up and down over a predetermined length.

4. A nut feeding apparatus for feeding a nut to an upper electrode of a resistance welding machine, comprising:
   a first rod advanced and retracted by an air cylinder;
   a second rod arranged above the first rod and advancing/retracting in conjunction with the first rod;
   a tube pneumatically feeding the nut;
   a link mechanism rotatable attached to a tip of the first rod and to a tip of the second rod using a first rotation axis and a second rotation axis, respectively; and
   a nut chuck fixed to the link mechanism on a forward side of the link mechanism and having a nut guide on an upper surface of the nut chuck, the nut guide being for catching and holding the nut fed by the tube, wherein
   the link mechanism rotates around the second rotation axis while the second rod is at a stop in a most advanced state and when the first rod further advances, to feed the nut held by the nut guide to the upper electrode,
   the nut feeding apparatus further comprises an upper claw provided on an upper portion of an opening of the tube, the upper claw extending in a direction of discharging nuts, and
   an upper surface of the nut chuck becomes substantially flush with a lower portion of the opening of the tube in a manner inclined along an orbit of the nut fed by the tube and the upper claw is arranged above the upper portion of the nut chuck and spaced apart therefrom by a predetermined distance, when the first rod is in a most retracted state.

5. A nut feeding apparatus for feeding a nut to an upper electrode of a resistance welding machine, comprising:
- a first rod advanced and retracted by an air cylinder;
- a second rod arranged above the first rod and advancing/retracting in conjunction with the first rod;
- a tube pneumatically feeding the nut;
- a link mechanism rotatable attached to a tip of the first rod and to a tip of the second rod using a first rotation axis and a second rotation axis, respectively; and
- a nut chuck fixed to the link mechanism on a forward side of the link mechanism and having a nut guide on an upper surface of the nut chuck, the nut guide being for catching and holding the nut fed by the tube, wherein
- the link mechanism rotates around the second rotation axis while the second rod is at a stop in a most advanced state and when the first rod further advances, to feed the nut held by the nut guide to the upper electrode,
- the nut feeding apparatus further comprises a first magnet provided on a lower surface of the nut chuck and in a position opposite to the nut guide, and a second magnet provided in a lower portion of the upper electrode, and
- the second magnet attracts the nut with a magnetic force stronger than that of the first magnet.

* * * * *